United States Patent [19]  [11] 4,363,887
Leep  [45] Dec. 14, 1982

[54] SOLVENT RESIN EMULSION ENAMEL COMPOSITION

[75] Inventor: Gus W. Leep, Elgin, Ill.

[73] Assignee: Seymour of Sycamore, Inc., Sycamore, Ill.

[21] Appl. No.: 272,509

[22] Filed: Jun. 11, 1981

[51] Int. Cl.$^3$ .............. C08L 23/00; C08L 63/00; C08L 67/02; C08L 75/06

[52] U.S. Cl. .................. 523/402; 524/148; 524/364; 524/378; 524/389; 524/475; 524/539; 524/556; 524/570; 524/577; 524/588; 524/591; 524/601; 524/903

[58] Field of Search ............... 106/311; 260/29.2 EP, 260/23 S, 29.2 M, 29.6 WQ, 29.6 PM, 29.6 MM, 22 A, 18 TN, 22 CB; 524/475, 148, 364, 378, 389, 539, 556, 570, 577, 588, 591, 601, 903; 523/402

[56] References Cited

U.S. PATENT DOCUMENTS

| | | | |
|---|---|---|---|
| 2,921,041 | 1/1960 | Francis | 260/23.3 |
| 3,474,057 | 10/1969 | De Vries | 260/23.3 |
| 3,484,260 | 12/1969 | Emslie et al. | 260/29.6 MM |
| 3,928,667 | 12/1975 | Carlos et al. | 260/29.6 ME |
| 3,997,492 | 12/1976 | Kane et al. | 260/29.6 MH |
| 3,998,775 | 12/1976 | Taub | 260/29.6 MN |
| 4,014,841 | 3/1977 | Taub | 260/29.6 MH |
| 4,070,510 | 1/1978 | Kahn | 427/385 R |
| 4,071,645 | 1/1978 | Kahn | 427/340 |
| 4,123,404 | 10/1978 | Lasher | 260/29.4 R |
| 4,147,681 | 4/1979 | Lim et al. | 260/29.6 WQ |
| 4,177,177 | 12/1979 | Vanderhoff et al. | 260/29.6 MN |
| 4,179,440 | 12/1979 | Martinez | 260/29.2 EP |
| 4,187,204 | 2/1980 | Howard | 260/29.2 EP |
| 4,252,706 | 2/1981 | Phillips et al. | 260/29.6 PM |
| 4,265,797 | 5/1981 | Suk | 260/29.6 E |

*Primary Examiner*—Ronald W. Griffin
*Attorney, Agent, or Firm*—Trexler, Bushnell & Wolters, Ltd.

[57] ABSTRACT

There is disclosed a water-in-oil emulsion enamel composition having water dispersed in an organic solvent soluble resin and solvent, and having the polar enamel pigment dispersed through the use of titanium derived coupling agents. Amine salts of pyrophosphato titanium derived coupling agents act as pigment dispersants and as the water-in-oil emulsifying agent. The composition may be mixed with a hydrocarbon propellant miscible in the continuous phase in suitable containers to produce a water containing aerosol spray enamel.

9 Claims, No Drawings

SOLVENT RESIN EMULSION ENAMEL COMPOSITION

BACKGROUND OF THE INVENTION

The present invention relates generally to emulsion coating compositions and specifically to a solvent resin enamel having water dispersed therein.

It has been a desideratum in the art to provide water-in-oil emulsion solvent resin enamel compositions which are capable of producing coatings having good hiding power or high gloss, and which are possessed with an adequate shelf life for commercial use. These enamels include water as part of the evaporative vehicle and comprise a dispersion, through the use of suitable emulsifying agents, of up to 80% by weight of water in a solution of organic solvents and a solvent soluble film-forming resin. The compositions further contain organic and inorganic polar pigments to impart color to the resultant film or coating. The dispersion of water in such compositions is not without problems where a polar pigmented enamel coating is desired.

While water-in-oil emulsion coating compositions have produced high gloss clear films and non-polar pigmented enamel coatings having a gloss of seventy units or above on a 60° gloss meter, when polar pigments are dispersed in the water-in-oil solution resin compositions the resultant gloss was found to be lower. In addition, it was found that after the initial mixing and testing of the polar pigmented enamels, the gloss of the coating produced by the enamel deteriorated with age. For example, after the enamel became a few days old, the composition deteriorated to the extent that it produced a gloss of only twenty to thirty units as compared to nearly eighty when the cans were one day old. Examination of the drying film of these enamels established that the loss of gloss was caused by pigment flocculation due to the adsorption of water on the surface of each pigment particle. During storage, the emulsified water is able to penetrate the organic surfactant which became attached to each pigment particle during the dispersion process, and disrupt the balance of the electrical charges within the paint system. This results in large pigment flocs being formed during the time that the enamel is passing through the drying stage i.e. from a wet condition to a tacky condition. Aside from the above-described problems with gloss enamels, such polar pigment flocculation has caused pigment dispersion problems in both semi-gloss and flat water-in-oil emulsion enamel paints.

SUMMARY OF THE INVENTION

Thus, a primary object of the invention is to provide a water-in-oil emulsion solvent resin enamel composition.

A further object of the invention is to provide a polar pigment high gloss solvent resin enamel composition having water dispersed therein as part of the evaporative vehicle.

A still further object of the invention is to provide a water-in-oil emulsion polar pigment gloss enamel composition which has a long shelf life.

Yet another object of the invention is to provide an aerosol-sprayable water-in-oil emulsion polar pigment gloss enamel composition.

The emulsion compositions of the present invention advantageously produce a polar pigment enamel finish having high gloss and/or good hiding power, and which resists the pigment flocculation during storage, through the use of titanium derived coupling agents which confer a hydrophobic nature to the pigment particles. Thus, the electrical balance of the polar pigment in the wet enamel is maintained and the particles are prohibited from flocculating into clusters of relatively enormous size, which heretofore had produced a loss of hiding power and a low gloss.

These emulsions comprise a water-in-oil emulsion coating composition having a continuous phase including an organic solvent and a film-forming resin dissolved in said solvent, with water dispersed in the continuous phase through the use of a suitable emulsifier. The composition may be applied by brush, roller or compressed air spraying apparatus as well as being advantageously suited to being sprayed from aerosol containers such as by the inclusion of an oil-phase soluble propellant. The water-in-oil emulsion is maintained through the use of an emulsifier or an emulsifier system having a hydrophile-lipophile balance, or HLB value, of from two to six, or through the use of amine salts of pyrophosphate titanium derived coupling agents as more fully described hereinafter.

Solvents which are contemplated by and have been found useful in the present invention include aliphatic and aromatic hydrocarbons, esters, ketones, glycol ethers and alcohols having a distillation range of from 100° to 500° F.

Although any organic solvent soluble film-forming resin is suitable for use in the present invention, resins which are preferred for use in the water-in-oil emulsion system are those with the greatest resistance to hydrolysis. Aliphatic and aromatic hydrocarbon resins possess this characteristic to a high degree, as do vinyl toluene and styrene modified resins. Epoxy ester resins also have a high resistance to hydrolysis because of the ether groups in the molecule and resultant steric hindrance found in these resins.

Resins which may be used to produce emulsion gloss enamels are the organic solvent soluble resins traditionally found in gloss paint compositions, including vinyl toluene modified alkyd resins, acrylic modified alkyd resins, styrene modified alkyd resins, aromatic hydrocarbon resins, acrylic/vinyl toluene modified alkyd resins and styrene/vinyl toluene modified alkyd resins.

According to one aspect of the present invention, a single emulsifier having an HLB of from two to six may be used. However, it is preferable to use a blend of emulsifiers, including a continuous phase component as well as an emulsifier for the dispersed phase, which produce an emulsifier system having an HLB of from two to six. When two or more of these emulsifiers are to be blended the HLB of the combination is calculated by the formula $xA + (1-x)B$ wherein x is the percent proportion of the emulsifier having an HLB of A and B is the HLB of the second emulsifier. It has been found that the most stable emulsion systems consist of blends of two or more emulsifiers, one portion having lipophilic tendences (HLB 0.5 to 5.0), and the other portion having hydrophilic tendencies (HLB 5.0 to 12.0).

In a water-in-oil emulsion enamel composition consisting of resin, solvents, polar pigment, water and an emulsifier system having a hydrophile-lipophile balance (HLB) of from two to six, titanium derived coupling agents such as isopropyl tri(dioctylphosphato) titanate, isopropyl tridodecylbenzenesulfonyl titanate and isopropyl tri(dioctylpyrophosphato) titanate may be advantageously used as the only surfactant in the pigment dispersion process in the manufacture of the enamel. In addition, it has been discovered that amine salts of pyrophosphato titanates are able to not only disperse the enamel pigment but also may serve as the only emulsifier in a gloss, semi-gloss or flat water-in-oil emulsion enamel. In addition, the use of water insoluble titanium derived coupling agents and amine titanate salts will prevent the microscopic leaching of the dispersant from the film upon exposure to moisture, and protect against the formation of a porous film which will provide a progressively lower degree of protection to the substrate.

The compositions of the present invention provide a polar pigment enamel wherein substantial cost savings are attained because of the lower cost of water as compared to organic solvents. The hazards and costs of unneeded flammable solvents are also markedly reduced.

Other objects and advantages will become apparent upon the review of the following detailed description and the appended claims.

DESCRIPTION OF THE PREFERRED EMBODIMENT

The percentages expressed herein, both in the specification and the claims appended thereto, are intended and expressed as percentages by weight of the total composition to which they refer.

As an illustration of the above-described problems encountered in the use of polar pigments in water-in-oil emulsion enamels, a gloss white enamel was prepared having the following composition:

| | |
|---|---|
| Titanium dioxide | 11.0% |
| Vinyl toluene modified alkyd resin | 14.7% |
| VM & P Naphtha | 14.5% |
| Aliphatic hydrocarbon solvent, boiling range, 300°-400° F. | 19.6% |
| Xylol | 7.5% |
| Pigment dispersant | 0.2% |
| Anti-settling agent | 1.8% |
| Mar resistance agent | 0.3% |
| Drier catalyst | 0.1% |
| Sorbitan trioleate (Span 85, HLB 1.8) | 0.25% |
| Polyethylene glycol monooleate (Mapeg 200 MO, HLB 8.0) | 0.05% |
| Water | 30.0% |
| | 100.0% |

This enamel was packed in an aerosol can with a propellant, a mixture of propane and isobutane, in the ratio of 30% propellant and 70% enamel. When sprayed from the container to a test panel, the enamel produced a gloss reading of approximately eighty when measured on a 60° gloss meter.

However, after having been stored for four days in the aerosol container, the gloss of the enamel sprayed from the aerosol container was reduced to approximately twenty-five units. Examination of the test panels showed that the reduction in gloss resulted from the flocculation of the pigment particles during storage, which resulted from the failure of known pigment dispersants to sufficiently encapsulate each pigment particle.

According to the present invention, the above-described problems of polar pigment flocculation in water-in-oil emulsion paints may be solved through the use of titanium derived coupling agents.

EXAMPLE I

Gloss White Enamel having stable gloss characteristics and using isopropyl tri(dioctylphosphato) titanate as the pigment dispersant:

| | |
|---|---|
| Titanium dioxide | 12.2% |
| Vinyl tolune modified alkyd resin | 16.1% |
| Aromatic hydrocarbon solvent, boiling range 311°-344° F. | 28.3% |
| VM & P Naphtha | 10.4% |
| Ethylene glycol butyl ether acetate | 1.4% |
| Isopropyl tri (dioctylphosphato) titanate (KR 12) | 0.05% |
| Anti-settling agent | 0.35% |
| Mar resistance agent | 0.10% |
| Drier catalysts | 0.30% |
| Sorbitan trioleate (Span 85, HLB 1.8) | 0.32% |
| Polyethylene glycol monooleate (Mapeg 200 MO, HLB 8.0) | 0.08% |
| Water | 30.4% |
| | 100.0% |

EXAMPLE II

Gloss Red Enamel having stable gloss characteristics and using tetraoctyloxytitanium di(ditridecylphosphite) as the pigment dispersant:

| | |
|---|---|
| Toluidine Red | 1.7% |
| Acrylic modified alkyd resin | 14.1% |
| Aromatic hydrocarbon solvent, boiling range 311°-344° F. | 34.2% |
| VM & P Naphtha | 12.8% |
| Xylol | 3.7% |
| Isophorone | 1.5% |
| Tetraoctyloxytitanium di (ditridecylphosphite) (KR 46B) | 0.01% |
| Anti-settling agent | 0.47% |
| Mar resistance agent | 0.27% |
| Drier catalysts | 0.11% |
| Sorbitan trioleate (Span 85, HLB 1.8) | 0.28% |
| Polyethylene glycol monooleate (Mapeg 200 MO, HLB 8.0) | 0.06% |
| Water | 30.8% |
| | 100.0% |

EXAMPLE III

Gloss Blue Enamel having stable gloss characteristics and using isopropyl tri(dioctylpyrophosphato) titanate as the pigment dispersant:

| | |
|---|---|
| Phthalocyanine blue | 1.6% |
| Styrene modified alkyd resin | 11.6% |
| Aromatic hydrocarbon resin | 5.8% |
| Aromatic hydrocarbon solvent, boiling range 311°-344° F. | 34.4% |
| VM & P Naphtha | 6.2% |
| Toluol | 5.8% |
| Xylol | 2.0% |
| Isophorone | 1.6% |
| Isopropyl tri (dioctylpyrophosphato) titanate (KR 38S) | 0.01% |
| Anti-settling agent | 0.49% |
| Mar resistance agent | 0.25% |
| Drier catalysts | 0.10% |
| Sorbitan trioleate (Span 85, HLB 1.8) | 0.29% |
| Polyethylene glycol monooleate (Mapeg 200 MO, HLB 8.0) | 0.06% |
| Water | 29.8% |

-continued

| | 100.0% |
|---|---|

EXAMPLE IV

Gloss Brown Enamel having stable gloss characteristics and using tetra(2, 2 diallyloxymethyl-1 butoxy) titanium di(di-tridecyl) phosphite as the pigment dispersant:

| Iron Oxide | 3.4% |
|---|---|
| Epoxy ester resin | 17.4% |
| Aromatic hydrocarbon solvent, boiling range 311°-344° F. | 26.0% |
| Xylol | 20.4% |
| Isophorone | 1.4% |
| Anti-settling agent | 0.47% |
| Anti-skinning agent | 0.01% |
| Tetra (2, 2 diallyoxymethyl-1 butoxy) titanium di (di-tridecyl) phosphite (KR 55) | 0.01% |
| Drier catalysts | 0.70% |
| Sorbitan trioleate (Span 85, HLB 1.8) | 0.26% |
| Polyethylene glycol monooleate (Mapeg 200 MO, HLB 8.0) | 0.05% |
| Water | 29.9% |
| | 100.0% |

EXAMPLE V

Gloss Green Enamel having stable gloss characteristics and using isopropyl tri(dioctylpyrophosphato) titanate as the pigment dispersant:

| Phthalocyanine green | 1.6% |
|---|---|
| Vinyl toluene and acrylic modified alkyd resin | 11.6% |
| Aromatic hydrocarbon resin | 5.8% |
| Aromatic hydrocarbon solvent, boiling range 311°-344° F. | 34.4% |
| VM & P Naphtha | 6.2% |
| Toluol | 5.8% |
| Xylol | 2.0% |
| Isophorone | 1.6% |
| Isopropyl tri (dioctylpyrophosphato) titanate (KR 38S) | 0.01% |
| Anti-settling agent | 0.49% |
| Mar resistance agent | 0.25% |
| Drier catalysts | 0.10% |
| Sorbitan trioleate (Span 85, HLB 1.8) | 0.29% |
| Polyethylene glycol monooleate (Mapeg 200 MO, HLB 8.0) | 0.06% |
| Water | 29.8% |
| | 100.0% |

The composition of Example I was prepared by first combining the titanate, pigment, pigment dispersant, antisettling agent and a portion of the resin and solvent in a mixing vessel as is known in the art. The mixing was continued until the pigment was dispersed to a suitable degree of fineness. Thereafter, the remainder of the resin and solvent was added along with the mar resistance agent and drier catalyst. When the mixing was completed, the oil dispersable emulsifier, HLB 1.8, was stirred into the enamel with a homogenizer-type intensive mixer. After five minutes of mixing, a solution of water and the water dispersable emulsifier, HLB 8.0 is poured into the enamel while under constant mixing. These two emulsifiers, as hereinbefore described, yielded a total emulsifier system value of $80\% \times 1.8 + 20\% \times 8.0 = 3.04$. The water-in-oil emulsion was formed within five to ten minutes.

The compositions of Examples II through V were prepared in a like manner. Each of the compositions of Examples I through V, when brushed or combined with a hydrocarbon propellant miscible in the continuous phase and sprayed from aerosol containers, provided enamel coating having an initial gloss of from 70 to 80 units. After three months of storage, the gloss of each remained in excess of 70 units.

The present invention contemplates the use of any titanium derived coupling agent which may function as a pigment dispersant. Additional titanate coupling agents found particularly useful include di(dioctylphosphato) ethylene titanate (KR 212), titanium di(dioctylpyrophosphate) oxyacetate (KR 138S) and di(dioctylpyrophosphato) ethylene titanate (KR 238S). The titanates identified herein by the designation KR are products of Kenrich PetroChemicals, Inc.

It was further discovered that amine salts of pyrophosphato titanium derived coupling agents not only advantageously disperse polar enamel pigment as heretofore described, but also may serve as the sole emulsifier for the water-in-oil emulsion enamel. Such phosphato amines include 2-dimethylamino methylpropanol, dimethylamino propyl methacrylamide, acrylic functional amine and triethylamine derivatives of titanium di(dioctylpyrophosphate) oxyacetate, titanium di(butyl, octyl pyrophosphate) di(dioctyl, hydrogen phosphite) oxyacetate, di(dioctylpyrophosphato) ethylene titanate, di(butyl, methyl pyrophosphato) ethylene titanate di(dioctyl, hydrogen phosphate) or other titanium derived coupling agents.

In the preferred form, the phosphato amine salt shown hereinafter in Example VI cures to an insoluble state in the dry enamel film, and provides the additional advantage of resistance to leaching when the enamel film is exposed to moisture.

EXAMPLE VI

Gloss White Enamel having stable gloss characteristics and using the acrylic functional amine salt of di(butyl, methyl pyrophosphato) ethylene titanate di(dioctyl, hydrogen phosphate) (KR 262A) as the pigment dispersant and emulsifier:

| Titanium dixoide | 12.2% |
|---|---|
| Vinyl toluene modified alkyd resin | 16.1% |
| Aromatic hydrocarbon solvent, boiling range 311°-344° F. | 28.3% |
| VM & P Naphtha | 10.8% |
| Ethylene glycol butyl ether acetate | 1.4% |
| Amine salt of pyrophosphato titanate (as above) | 0.05% |
| Anti-settling agent | 0.35% |
| Mar resistance agent | 0.1% |
| Drier catalysts | 0.3% |
| Water | 30.4% |
| | 100.0% |

EXAMPLE VII

Gloss White Enamel having stable gloss characteristics and using the acrylic functional amine salt of di(dioctylpyrophosphato) ethylene titanate (KR 238A) as the pigment dispersant and emulsifier:

| Titanium dioxide | 12.2% |
|---|---|
| Vinyl toluene modified alkyd resin | 16.1% |
| Aromatic hydrocarbon solvent, boiling range 311°-344° F. | 28.3% |

| | |
|---|---|
| VM & P Naphtha | 10.8% |
| Ethylene glycol butyl ether acetate | 1.4% |
| Amine salt of pyrophosphato titanate (as above) | 0.05% |
| Anti-settling agent | 0.35% |
| Mar resistance agent | 0.1% |
| Drier catalysts | 0.3% |
| Water | 30.4% |
| | 100.0% |

The compositions of Examples VI and VII were prepared by the method hereinbefore described, with the omission of the emulsifying agents previously employed, and produced stable emulsions and coatings having a gloss in excess of 70 units upon mixing and after long storage.

Additional advantages in the use of titanium derived coupling agents and amine salts thereof were found in semi-gloss and flat enamel as well as gloss compositions. The additives of the present invention were found to substantially improve the pigment strength and thus the hiding power of the various enamels including those using relatively non-polar pigments such as carbon black. This improvement was shown in a marking paint composition primarily employed in the production of lines, numbers or other indicia on grass, or pavement. By the nature of its use, hiding power is of utmost importance in this product.

EXAMPLE VIII

White Ground Marking Paint using isopropyl tri(dioctylphosphato) titanate as the pigment dispersant:

| | |
|---|---|
| Titanium dioxide | 11.34% |
| Calcium carbonate | 2.59% |
| Aromatic hydrocarbon resin | 14.09% |
| Toluol | 15.00% |
| Aromatic hydrocarbon solvent, boiling range 311°-344° F. | 4.45% |
| Anti-settling agent | 1.02% |
| Drier catalyst | 0.22% |
| Isopropyl tri (dioctylphosphato) titanate (KR 12) | 0.05% |
| Sorbitan trioleate (Span 85, HLB 1.8) | 0.24% |
| Polyethylene glycol monooleate (Mapeg 200 MO, HLB 8.0) | 0.06% |
| Water | 50.94% |
| | 100.0% |

As hereinbefore described, the marking paint may be advantageously made with an amine salt of a pyrophosphato titanate as the pigment dispersant and the only emulsifier to produce a stable water-in-oil emulsion enamel with vastly increased coverage.

EXAMPLE IX

White Ground Marking Paint using the acrylic functional amine salt of di(butyl, methyl pyrophosphato) ethylene titanate di(dioctyl, hydrogen phosphate) (KR 262A) as the pigment dispersant and emulsifier:

| | |
|---|---|
| Titanium dioxide | 11.34% |
| Calcium carbonate | 2.59% |
| Aromatic hydrocarbon resin | 14.34% |
| Toluol | 15.00% |
| Aromatic hydrocarbon solvent, boiling range 311°-344° F. | 4.50% |
| Anti-settling agent | 1.02% |
| Drier catalyst | 0.22% |
| Amine salt of pyrophosphato titanate (as above) | 0.05% |
| Water | 50.94% |
| | 100.00% |

As with all of the compositions hereinbefore described, the use of water-in-oil emulsion titanate dispersed enamel is particularly desirable in such ground marking compositions, as increased coverage and hiding power over traditional solvent resin enamels are obtained, through the use of titanium derived coupling agents and derivatives thereof, at the low cost which results from the inclusion of substantial amounts of water in the composition.

Each of the described compositions of Examples I through IX, whether applied by a brush or sprayed from an aerosol container, provided a polar pigmented enamel coating heretofore unobtainable in a water containing paint.

In addition, the compositions of the present invention may incorporate the resins, solvents, emulsifiers and other ingredients identified in the water-in-oil emulsion coating compositions identified in the co-pending patent applications of Gus W. Leep and Morris J. Root entitled "Coating Composition", and of Gus W. Leep and Gary L. Bolt entitled "Solvent Resin Emulsion Gloss Coating Composition", each filed on June 11, 1981; one having Ser. No. 272,784, the other having Ser. No. 272,508, the specifications of which are incorporated by reference herein.

From the foregoing description, one skilled in the art can easily ascertain the essential characteristics of the invention, and without departing from the spirit and scope thereof, can make various changes and modifications to adapt the invention to various usages and conditions.

The invention is claimed as follows:

1. A water-in-oil emulsion enamel composition for a substrate to which the composition is applied comprising: a continuous oil phase including an organic solvent soluble resin capable of forming a coating on the substrate and an evaporable solvent for said resin; water dispersed in said oil phase; an effective amount of an emulsifier system having a hydrophile-lipophile balance of from two to six; a polar pigment dispersed in said composition; and an effective amount of a titanium derived coupling agent as a pigment dispersant, said pigment dispersant being included within said emulsifier system whereby substantially no loss of gloss of said enamel composition is experienced after said enamel composition has dried and cured to form said coating on said substrate.

2. A water-in-oil enamel composition for a substrate comprising: a continuous oil phase including an organic solvent soluble resin capable of forming a film on the substrate and an evaporable solvent for said resin; water dispersed in said oil phase; and an effective amount of an amine salt of a pyrophosphato titanium derived coupling agent as a pigment dispersant and an emulsifier.

3. A water-in-oil enamel composition according to claim 1 or 2 wherein said resin is selected from the group consisting of acrylic resin, alkyd resin, oil modified polyurethane polymers, epoxy ester resin, aromatic hydrocarbon resin, aliphatic hydrocarbon resin, vinyl toluene modified alkyd resin, acrylic modified alkyd resin, solution vinyl resin, silicone resin and mixtures thereof.

4. A water-in-oil enamel composition according to claim 1 or 2 wherein said solvent has a boiling range of between 100° and 500° F.

5. A water-in-oil enamel composition according to claim 3 wherein said solvent is selected from the group consisting of toluene, xylene, naphtha, ketones, esters, glycol ethers, alcohols and mixtures thereof wherein said solvent has a boiling range of between 100° and 500° F.

6. A method for producing a water-in-oil emulsion enamel coating composition, said method comprising the steps of: mixing an evaporable organic solvent, a film-forming resin soluble in said solvent, an oil dispersible emulsifier having a hydrophile-lipophile balance of from 0.5 to 5.0, a polar pigment and a titanium derived coupling agent thereby producing a mixture; then mixing said mixture with water and a water dispersible emulsifier having a hydrophile-lipophile balance of from 5.0 to 12.0 thereby producing said water-in-oil emulsion, said oil dispersible emulsifier and said water dispersible emulsifier collectively being included within an emulsifier system, said titanium derived coupling agent being a pigment dispersant for said polar pigment, whereupon said pigment dispersant also functions as an emulsifier and thereby is further included within said emulsifier system whereby substantially no loss of gloss of said enamel coating composition is experienced after said enamel coating composition has dried and cured to form a coating on a workpiece.

7. A method according to claim 6 wherein said resin is selected from the group consisting of acrylic resin, alkyd resin, oil modified polyurethane polymers, epoxy ester resin, aromatic hydrocarbon resin, aliphatic hydrocarbon resin, vinyl toluene modified alkyd resin, acrylic modified alkyd resin, solution vinyl resin, silicone resin and mixtures thereof.

8. A method according to claim 6 wherein said solvent has a boiling range of between 100° and 500° F.

9. A method according to claim 7 wherein said solvent is selected from the group consisting of toluene, xylene, naphtha, ketones, esters, glycol ethers, alcohols and mixtures thereof wherein said solvent has a boiling range of between 100° and 500° F.

* * * * *